(12) United States Patent
Ducellier et al.

(10) Patent No.: US 7,027,684 B2
(45) Date of Patent: Apr. 11, 2006

(54) WAVELENGTH SELECTIVE SWITCH

(75) Inventors: Thomas Ducellier, Ottawa (CA); Alan Hnatiw, Stittsville (CA)

(73) Assignee: Metconnex Canada Inc., Ottawa (CA)

( * ) Notice: Subject to any disclaimer, the term of this patent is extended or adjusted under 35 U.S.C. 154(b) by 38 days.

(21) Appl. No.: 10/493,102

(22) PCT Filed: May 20, 2003

(86) PCT No.: PCT/CA03/00749

§ 371 (c)(1),
(2), (4) Date: Apr. 20, 2004

(87) PCT Pub. No.: WO03/098961

PCT Pub. Date: Nov. 27, 2003

(65) Prior Publication Data

US 2004/0258351 A1     Dec. 23, 2004

Related U.S. Application Data

(60) Provisional application No. 60/381,373, filed on May 20, 2002.

(51) Int. Cl.
*G02B 6/28*    (2006.01)
*H04J 14/02*   (2006.01)

(52) U.S. Cl. .............. 385/24; 385/15; 385/16; 385/17; 385/18; 398/79; 398/80; 398/81; 398/82; 398/83; 398/84; 398/85

(58) Field of Classification Search .............. 385/24, 385/15, 16, 17, 18; 398/79, 81, 80, 82, 83, 398/84, 85
See application file for complete search history.

(56) References Cited

U.S. PATENT DOCUMENTS

| | | | | |
|---|---|---|---|---|
| 4,335,933 A | * | 6/1982 | Palmer ..................... | 385/36 |
| 6,144,783 A | | 11/2000 | Epworth et al. ............ | 385/24 |
| 6,226,426 B1 | * | 5/2001 | Magne et al. ............... | 385/24 |
| 6,301,409 B1 | * | 10/2001 | Whiteaway et al. ......... | 385/37 |
| 6,337,935 B1 | | 1/2002 | Ford et al. .................. | 385/24 |
| 6,381,052 B1 | * | 4/2002 | Delisle et al. .............. | 398/87 |

FOREIGN PATENT DOCUMENTS

| | | |
|---|---|---|
| EP | 1052868 | 5/2000 |
| EP | 1189476 | 9/2000 |
| EP | 1244327 | 2/2002 |
| GB | 1052868 A2 * | 11/2000 |

OTHER PUBLICATIONS

S. Bigo; Optical Fiber Communications Conference, WX 3, Anaheim, 2002pp. 362-364.

Joseph E. Ford; Vladimir A. Aksyuk, David J. Bishop; James A. Walker; Wavelength Add-Drop Switching Using Tilting Micromirrors; Journal of Lightwave Technology, vol. 17, No. 5, May 1999, pp. 904-911.

(Continued)

*Primary Examiner*—Brian Healy
*Assistant Examiner*—Jerry Martin Blevins

(57) ABSTRACT

A wavelength selective switch is realized by combining a quantized dispersion element and an array of switching means. The quantized dispersion element enables to concentrate all the wavelengths within predetermined wavelength bands onto the same location in the switching array. With this arrangement, a low fill factor switching array can be used while maintaining good flat-top spectral performance with no spectral dips and improving alignment tolerances.

31 Claims, 12 Drawing Sheets

OTHER PUBLICATIONS

M. Katayama et al; Micromachined Curling Optical Switch Array for PLC-Based, Integrated Programmable Add/Drop Multiplexer; Optical Society of America, 2000.

D.T. Neilson et al.; High-Dynamic Range Channelized MEMS Equalizing Filter; OFC 2002, pp. 586-588.

D.M. Marom, et al; Wavelength-Selective 1×4 Switch for 128 WDM Channels at 50 GHz Spacing; OFC 2002 Postdeadline Papers.

C.R. Doerr et al; Compact and Low-Loss Integrated Flat-Top Passband Demux; Amsterdam, 2001.

* cited by examiner

WAVELENGTH SELECTIVE SWITCH

RELATED APPLICATIONS

This application claims the benefit of U.S. Provisional Application No. 60/381,373 filed on May 20, 2002.

FIELD OF THE INVENTION

This invention relates to the field of DWDM fibre optics telecommunications and in particular to the field of all-optical switching.

BACKGROUND OF THE INVENTION

The advent of DWDM fibre optics telecommunications systems in the early 1990s have enabled a dramatic increase in the transmission capacity over point-to-point links. This was achieved through multiplexing of a large number of individually modulated light beams of different wavelengths onto the same optical fibre. Typical systems installed today would have 64 or more independent channels precisely aligned onto an ITU-T standardized grid at 100 GHz, 50 GHz or even narrower channel spacing. With routine modulation speeds of 10 Gb/s and attaining 40 Gb/s in field trials, it is not unusual to obtain aggregated capacities in the order of several terabits per second of information being transmitted onto a single optical fibre (S. Bigo, Optical Fibre Communications conference, WX 3, pp. 362–364, Anaheim, 2002). At the same time, electrical switching capacities have been growing at a much slower rate, with the largest current electrical switch matrices limited to typically 640 Gb/s in single stage. Furthermore, the cost of converting the signal from optical to electrical for switching and then back from electrical to optical becomes prohibitively expensive as the number of optical channels increases. All optical switching technologies are therefore becoming more and more attractive to manage this enormous bandwidth.

An all-optical switch would consist of a large core optical switching matrix surrounded by DWDM demultiplexers and multiplexers at the fibre interface. However, for a large number of wavelength channels per optical fibre, this leads to a very large switching core size: for example, a 50 GHz channel spacing system with 128 channels per fibre would require a 1024×1024 switching matrix to switch traffic between 8 incoming fibres and 8 outgoing fibres on a per wavelength basis. Large optical switching matrices are hard to fabricate, complex to control, require overwhelming fibre management and are very expensive. Furthermore, in the absence of wavelength conversion, only a sub-set of the switching matrix capacity is actually in use: with each wavelength being switched independently, only 128 8×8 independent connections are used in the 1024×1024 available (0.8% of the overall switching capacity). This huge inefficiency is the primary reason for considering a wavelength switching architecture in which the DWDM demultiplexing and multiplexing are integrated with the switching function.

Both free-space optics (J. E. Ford et al., Journal of Lightwave Technologies, Vol. 17, No. 5, May 1999) and waveguide optics (M. Katayama et al., Optical Fibre Communication conference, WX4, Anaheim, 2001) embodiments have been proposed in the past. So far, free-space optics embodiments have enabled the highest optical performance in terms of spectral efficiency, with for example, 85 GHz full width at half maximum passband for 100 GHz spacing (D. T. Neilson et al., Optical Fibre Communication conference, ThCC3, pp. 586–588, Anaheim, 2002). However, to obtain this level of spectral efficiency requires an array of actuators (in the case of this last reference, MEMS micro-mirrors) with a very high fill factor. This poses severe constraints on manufacturing and on long term reliability, due to increased risk of lateral stiction from neighbouring mirrors for example in the case of MEMS. Furthermore, the finite gap between actuators shows as "dips" in the spectrum, even when consecutive switching elements are not actuated. Upon multiple cascades in the network, these dips could cause signal degradation.

It would therefore be advantageous to have a wavelength selective switch in which a low fill factor actuation array can be used while maintaining high spectral efficiency.

SUMMARY OF THE INVENTION

According to one broad aspect, the invention provides a wavelength switch comprising: at least one quantized dispersive element having a substantially quantized dispersion characteristic adapted to demultiplex an incoming DWDM light beam to produce a plurality of demultiplexed light beams; a plurality of switching elements each adapted to perform light beam redirection; the at least one quantized dispersive element being arranged to direct a respective one of the plurality of demultiplexed light beams to a respective single switching element in the plurality of switching elements for redirection.

In some embodiments, the switch further comprises: a bulk optical element having optical power between the at least one quantized dispersive element and the plurality of switching elements adapted to couple each demultiplexed light beam onto the respective switching element.

In some embodiments, the bulk optical element having optical power is selected from a group consisting of a lens, a curved mirror, an assembly of lenses and mirrors, and an assembly of lenses, mirrors and curved mirror.

In some embodiments, the switch comprises: a plurality of dispersive elements including said at least one quantized dispersive element; a respective port for each dispersive element; wherein the switching elements are adapted to redirect each of the plurality of light beams to a respective one of the dispersive elements.

In some embodiments, all of the dispersive elements have a substantially quantized dispersion characteristic.

In some embodiments, the switch comprises a plurality of dispersive elements including said at least one quantized dispersive element, wherein the switching elements are adapted to redirect each of the plurality of light beams through the bulk optical element to a respective one of the dispersive elements.

In some embodiments, the array of switching elements comprises an array of tiltable micro-mirrors.

In some embodiments, the array of switching elements comprises transmissive switching elements, the switch further comprising: a plurality of dispersive elements, wherein at least one of the plurality of dispersive elements has a substantially quantized dispersion characteristic; and a respective port for said at least one quantized dispersive element and for each of the plurality of dispersive elements; wherein the transmissive switching elements are adapted to redirect each of the plurality of light beams to a respective one of the plurality of dispersive elements.

In some embodiments, all of said plurality of dispersive elements have a substantially quantized dispersion characteristic.

In some embodiments, the array of switching elements comprises an array of tiltable micro-mirrors and wherein the dispersive elements and the array of tiltable micro-mirrors are placed substantially at focal planes of the bulk optical element having optical power.

In some embodiments, the plurality of switching elements comprises a plurality of beam steering means in transmission.

In some embodiments, the plurality of switching elements comprises a plurality of beam steering means in transmission comprising either an optical phase array or an electro-hologram and wherein the dispersive elements and the plurality of beam steering means are placed substantially at focal planes of the bulk optical element having optical power.

In some embodiments, the switch further comprises: a respective port for each dispersive element; a micro-optics coupling scheme adapted to couple light from each input port to and from the respective dispersive element.

In some embodiments, the switch further comprises: a respective port for each dispersive element; an integrated coupling optics scheme adapted to couple light from each port to and from the respective dispersive element.

In some embodiments, each quantized dispersive element is fabricated on a waveguide substrate.

In some embodiments, the bulk optical element having power comprises: a first transverse cylindrical lens adapted to substantially collimate light in a plane perpendicular to a plane of the waveguide substrate; a main cylindrical lens element adapted to focus light in a second plane in the plane of the waveguide substrate.

In some embodiments, the main cylindrical lens has a focal length such that the at least one waveguide dispersive elements are in a focal plane of the lens on a first side of the lens, and the plurality of switching elements are in a focal plane of the lens on a second side of the lens.

In some embodiments, each substantially quantized dispersive element comprises: two continuous dispersive elements providing respective dispersion steps of D/2; a plurality of micro-telescopes situated between the two continuous dispersive elements adapted to invert wavelengths within respective predetermined bands defined by a physical extent of the micro-telescopes and their spacing.

In some embodiments, the two continuous dispersive elements comprise transmissive diffraction gratings.

In some embodiments, the two continuous dispersive elements comprise reflective diffraction gratings.

In some embodiments, the two continuous dispersive elements comprise prisms.

In some embodiments, each substantially quantized dispersive element comprises: a concatenation of a first arrayed waveguide grating (AWG) and a second AWG with a free spectral range (FSR) of the first AWG equalling a channel spacing of the second AWG.

In some embodiments, each substantially quantized dispersive element comprises: at least two groups of waveguides, each group containing multiple waveguides having a predetermined relative phase relationship, and one of the at least two groups having a larger relative phase offset.

In some embodiments, a phase offset between the at least two groups of waveguides corresponds to a channel spacing while the relative phase relationship between the waveguides in each of the at least two groups is chosen to provide a large FSR and the channel spacing.

In some embodiments, the array of switching elements is a low fill factor switching array.

According to another broad aspect, the invention provides a switch comprising: a plurality of ports; for each port, a respective dispersive element with a substantially quantized dispersion characteristic; a plurality of switching elements; a bulk optical element having optical power adapted to couple a demultiplexed light beam received from any of the dispersive elements to one of the switching elements and to couple each light beam received from one of the switching elements to a respective one of the dispersive elements; wherein each dispersive element further multiplexes any light beams received from the bulk optical element having power to produce a respective a multiplexed output signal at the respective port.

According to another broad aspect, the invention provides a method of wavelength switching comprising: demultiplexing an incoming DWDM light beam using a quantized dispersive element to produce demultiplexed beams; coupling the demultiplexed beams onto respective switching elements in an array; remultiplexing the light beams into output ports.

Another broad aspect of the invention provides an apparatus comprising at least one quantized dispersive element having a substantially quantized dispersion characteristic adapted to demultiplex an incoming DWDM light beam to produce a plurality of demultiplexed light beams; a plurality of light processing elements each adapted to perform light processing; the at least one quantized dispersive element being arranged to direct a respective one of the plurality of demultiplexed light beams to a respective single light processing element in the plurality of light processing elements for processing.

In some embodiments, each-light processing element is adapted to perform at least one of changing polarization state, attenuating power, detecting light signals, and limiting optical power.

Another broad aspect of the invention provides a method comprising demultiplexing an incoming DWDM light beam using a quantized dispersive element to produce demultiplexed beams; coupling the demultiplexed beams onto respective light processing elements in an array; processing the demultiplexed beams with the light processing elements.

More generally, methods based on any of the disclosed apparatuses are provided.

DETAILED DESCRIPTION OF THE PREFERRED EMBODIMENTS

Figure 1:
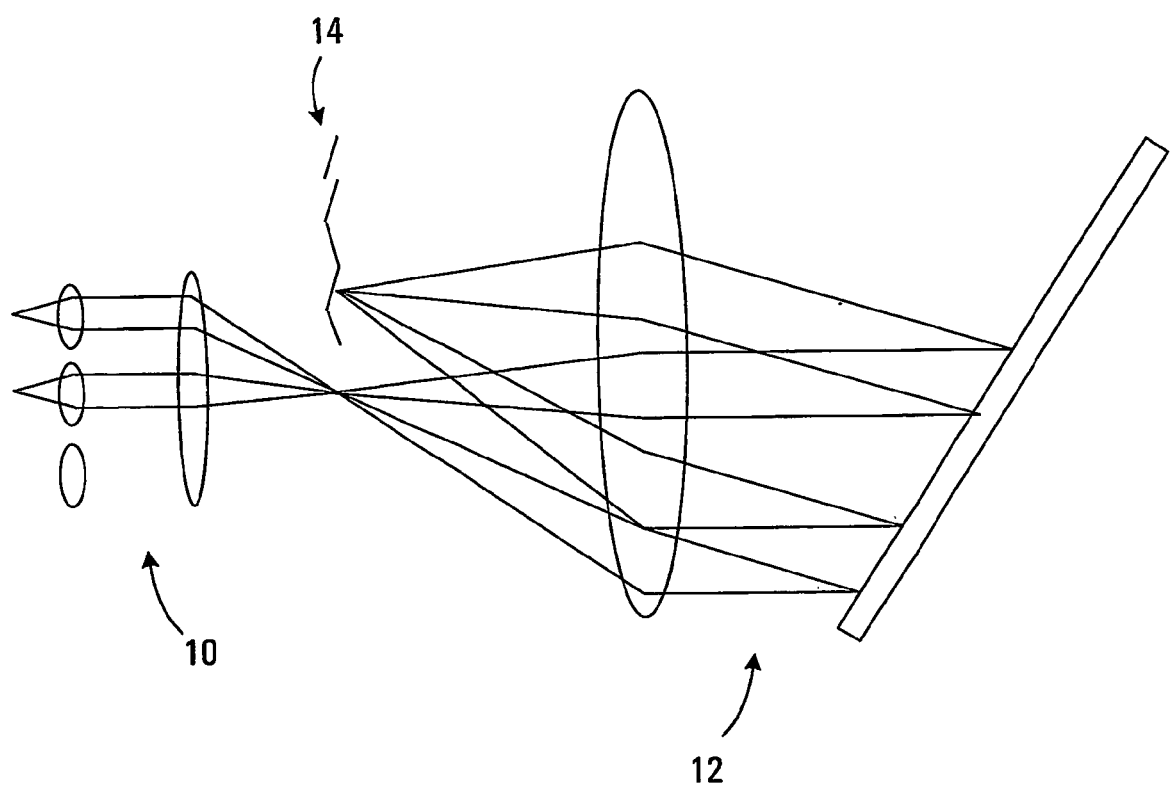
FIG. 1 shows a conventional free-space wavelength selective switch.

FIG. 1 shows a wavelength selective switch configured as a 1×3 as per the prior art (D. M. Marom et al., Optical Fibre Communication conference, PD FB7, Anaheim, 2002). It consists of a set of ports 10 coupled to a continuous wavelength dispersive optical arrangement 12 coupled to an array of micro-mirrors 14 capable of tilting in the plane of the figure.

The key characteristics of this arrangement is the use of a continuous dispersive arrangement coupled to a relatively high fill factor switching array. There is a need to precisely align the wavelengths dispersed by the dispersive arrangement to their respective switching element of the array.

Figure 2A:
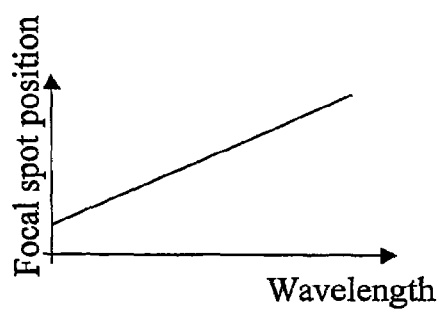
FIG. 2A shows a conventional continuous dispersion profile.

FIG. 2A shows the dispersion profile of the continuous dispersive element used in prior art. Regardless of the specific dispersive element used amongst those listed above, a constant feature is the fact that the angles (or positions) of the beams containing different consecutive wavelengths exiting the continuous dispersive element are spread continually over a range of angles and positions. There are no steps in the curve.

Figure 2B:
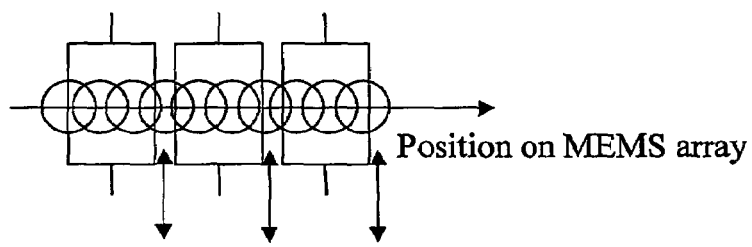
FIG. 2B shows a superimposed continuously dispersed light beams on top of a high fill factor MEMS switching array achieved with the conventional arrangement of FIG. 1.

FIG. 2B shows nine such beams containing wavelengths spanning three wavelength channels (this is a simplification for ease of description since there is actually a continuum of such beams) superimposed with the switching array. Some beams land perfectly within the boundaries of their respective switching elements and are therefore switched efficiently with low loss, and some other beams fall right in-between the mirrors and therefore are lost, causing insertion loss.

Figure 2C:
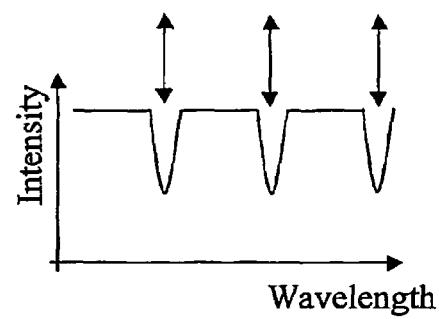
FIG. 2C shows the "dips" on the output spectrum resulting from the finite gap in-between mirrors of FIG. 2B.

FIG. 2C shows the insertion loss curve for the arrangement of FIGS. 1, 2A and 2B when all switching elements are actuated to couple the light to the same output port. The above mentioned beams that land perfectly on the switching elements have minimum insertion loss, while the lost beams in-between the mirrors contribute to a significant loss, for example 2 dB. This shows up as a "dip" in the spectrum. Even with extremely high fill factor (>98%), this dip is typically on the order of a few dBs (D. M. Marom et al., Optical Fibre Communication conference, PD FB7, Anaheim, 2002, see particularly FIG. 5). Since such an optical switch is likely to reside in most of the network's switching nodes, a signal propagating through an optical network can see a large number of cascades of optical switches (up to 10–20). In this case, the 2 dB per switch adds up at every cascade, yielding a 20–40 dB dip. At such a level, the pass-band is severely narrowed and the signal gets distorted.

Furthermore, as there is light present on the edges of the switching elements, there is a significant amount of spurious diffraction from those edges potentially causing cross-talk into the output ports.

Finally, the centre wavelengths of each wavelength channel have to be precisely aligned to the centre of their respective switching element, and this alignment has to be maintained over a wide range of temperature or mechanical conditions.

Figure 3A:
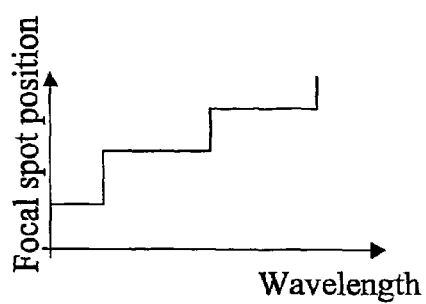
FIG. 3A shows a quantized dispersion profile in which predetermined wavelength bands are dispersed by a set of finite values.
Figure 3B:
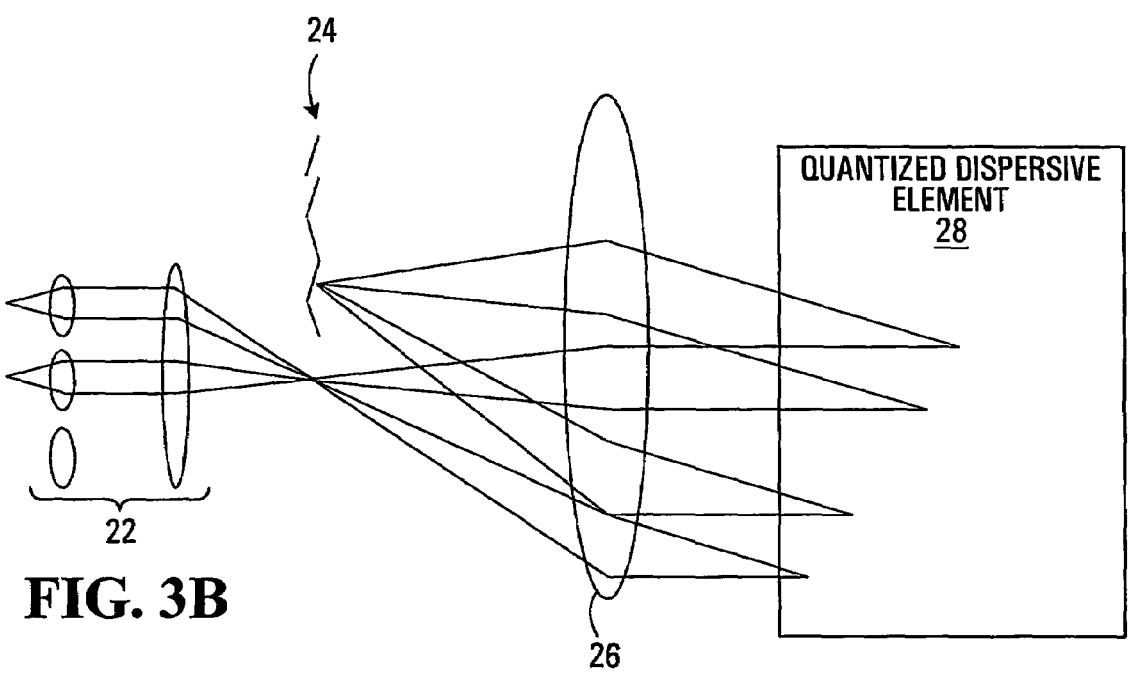
FIG. 3B shows a wavelength switch provided by an embodiment of the invention.
Figure 4:
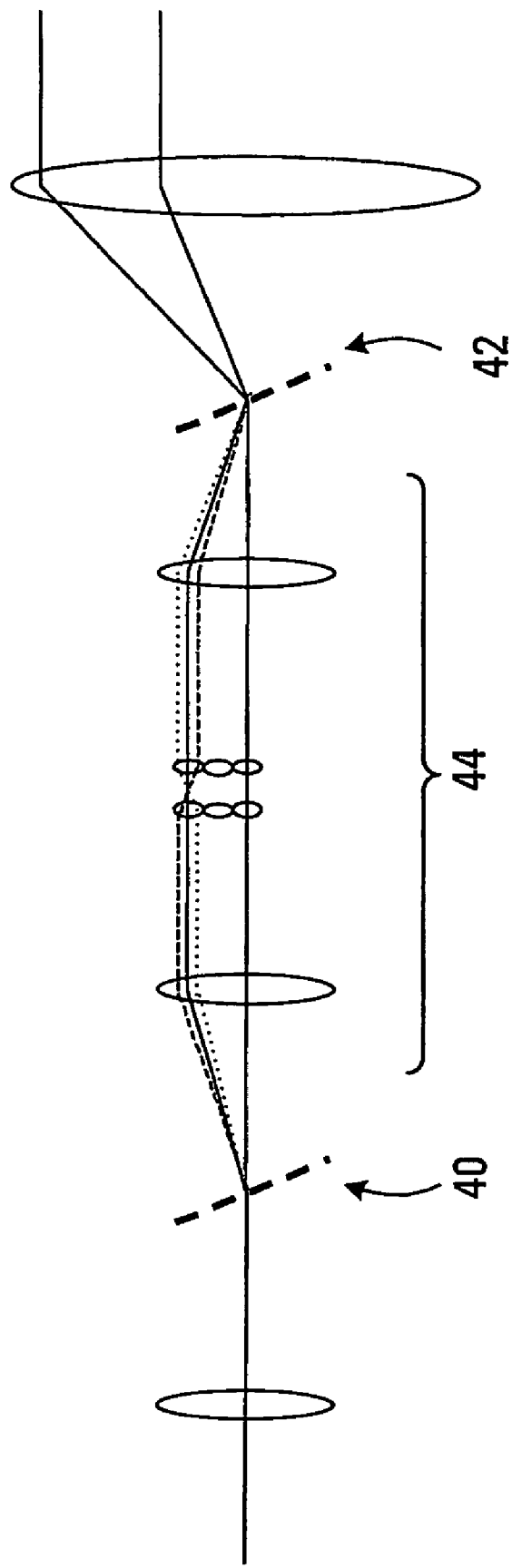
FIG. 4 shows a conventional free-space arrangement capable of performing quantized dispersion.
Figure 6:
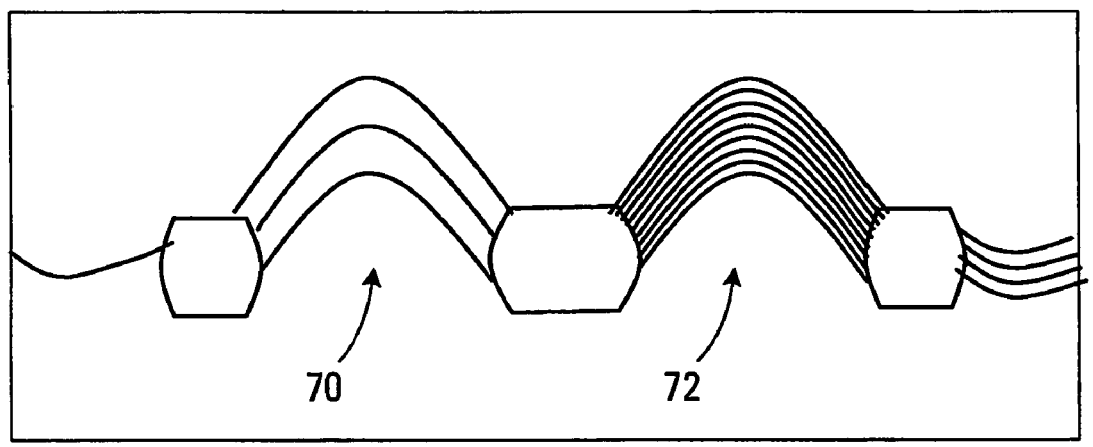
FIG. 6 shows a conventional waveguide arrangement of a quantized dispersion based wavelength demultiplexer.
Figure 8:
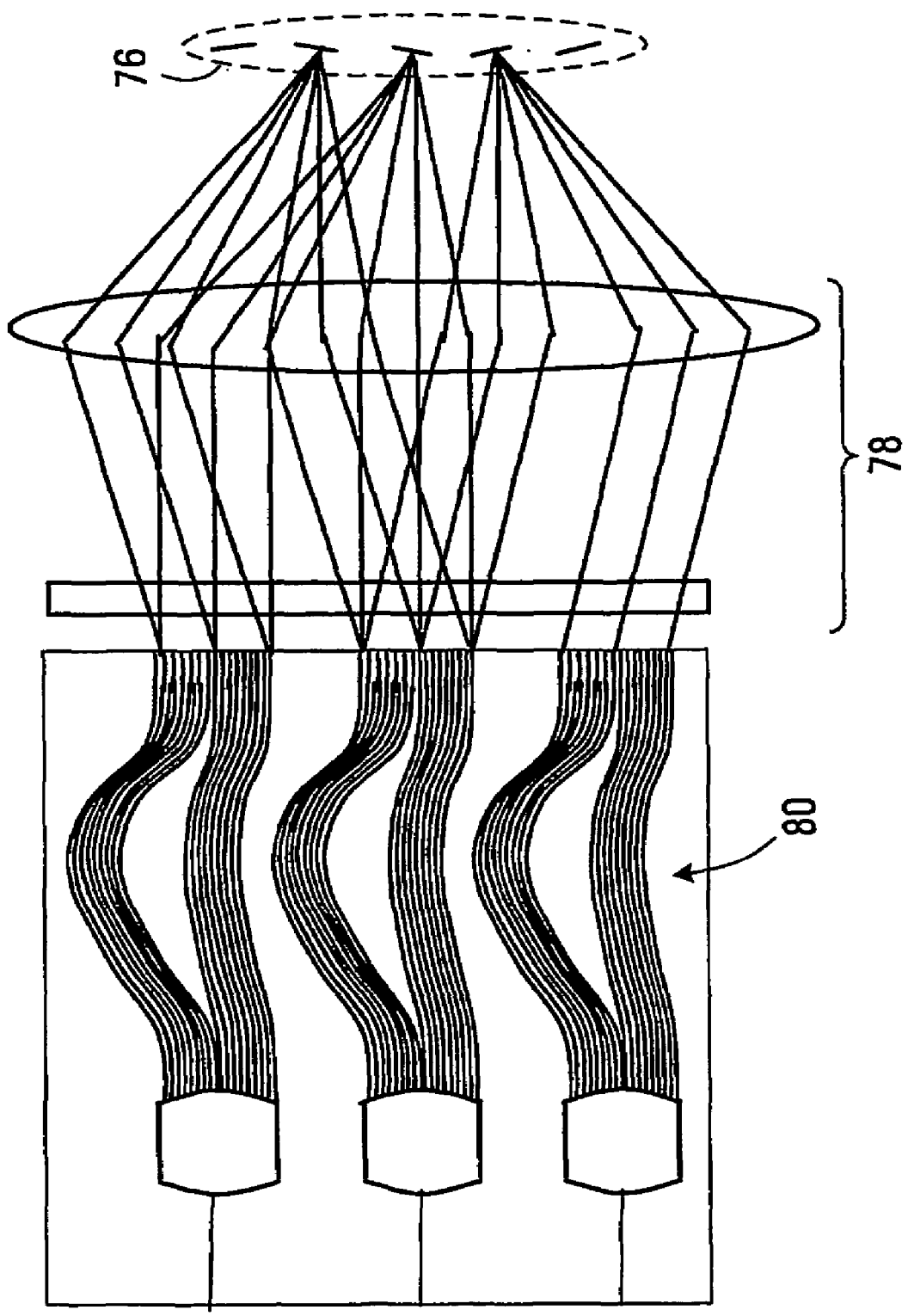
FIG. 8 shows another embodiment of the invention using a hybrid waveguide and a low fill factor switching array with another waveguide quantized dispersion element.

Embodiments of the invention provide an all-optical wavelength switch in which a quantized dispersive element is employed. FIG. 3A shows the dispersion profile of a quantized dispersion element. Such an element produces a staircase-like curve of angles (or locations) versus wavelength. FIGS. 4, 6 and 8 show examples of such a quantized dispersive element. Basically, all wavelengths within predetermined bands are routed to a finite set of angles (locations). For the best mode, each predetermined band is associated with a respective switching element. In a first embodiment of the invention, an arrangement like that of FIG. 1 is provided in which the dispersive element forming part of the continuous wavelength dispersive optical arrangement 12 is replaced with a quantized dispersive element. An example of this is shown in FIG. 3B. Shown are a number of input ports coupled through coupling optics 22. Light is coupled through a main lens 26 to the quantized dispersive element 28 which causes wavelength dependent dispersion to occur and redirects light back through the main lens 26 to the array of switching elements 24. Light then traverses back through the main lens 26 to the quantized dispersive element 28 and back to one of the ports via the coupling optics 22. The quantized dispersive element 28 has a characteristic such as shown in FIG. 3A.

Figure 3C:
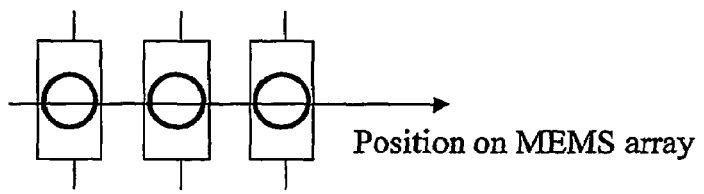
FIG. 3C shows the superimposed dispersed light beams of FIG. 3B on top of a low fill factor MEMS array.

FIG. 3C, as for FIG. 2B, shows nine beams containing wavelength spanning three wavelength channels. Due to the quantized dispersion curve showed in FIG. 3A, all of the beams within a wavelength band are routed to a respective single location (thus there are only three locations containing three overlapped beams shown in the figure). The fill factor no longer needs to be extremely high, as the overlapped beams are condensed in the vicinity of the central region of the mirrors. As long as the switching elements are loosely aligned with those overlapped beams, they will be switched efficiently and with minimal losses. The alignment tolerance can be increased by providing switching elements slightly bigger than the overlapped beams. Any relative movement between the switching array and the dispersive element has no effect as long as the overlapped beams are still within the boundaries of the switching element. In the particular case of FIG. 3C, a misalignment to the left has been shown, but has no impact on the coupling efficiency of the beam. Furthermore, since no light is impinging on the switching elements' edges, there is no problem with spurious diffraction.

Figure 3D:
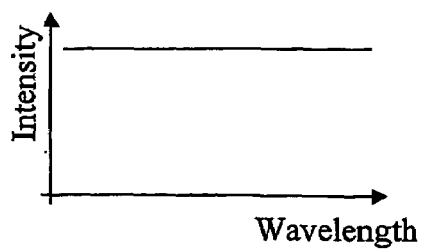
FIG. 3D shows that with the arrangement of FIG. 3B, there is no light landing on the gaps in-between the mirrors and therefore, the spectrum is continuous and shows no dips.

FIG. 3D shows the insertion loss curve for a device as per an embodiment of the invention and described in FIG. 3B when all switching elements are actuated to couple the light in the same output port. There is no dip since no light is lost in the gaps in-between the switching elements.

Therefore, by providing a quantized dispersive element and an array of switching elements aligned such that the overlapped beams produced by the quantized dispersive means lie within the physical boundaries of their respective switching element, a very efficient wavelength switch is realized that has significantly improved wavelength alignment tolerance (initial alignment and maintaining of this alignment over temperature and averse mechanical conditions), no spectral dips, no spurious diffraction from the switching elements' edges and lower fill factor requirement for the switching array.

It should be noted here that since in general wavelength switches like the one shown in FIG. 1 have a flat-top channel shape, it is counter-intuitive to use a flat-topping dispersion arrangement within a wavelength switch that may be one of many reasons why it has never been done before. It is indeed rather strange to use a complex flat-topping technology for an intrinsically flat-top device. However this combination of quantized dispersion and wavelength switching yields surprising results in terms of optical performances (mainly absence of dips in-between wavelength channels, absence of spurious diffraction problem, use of lower fill factor array of switching elements and improved wavelength alignment tolerances).

FIG. 4 shows one example of a quantized dispersive element taught in U.S. Pat. No. 6,381,052, V. Delisle hereby incorporated by reference in its entirety. The arrangement provides a first dispersion step of D/2 with dispersive element 40, inversion optics 44 for doing an inversion of the wavelength bands in the focal plane, and providing a second dispersion amount of D/2 with dispersive element 42 yields a dispersive device with a staircase-like dispersion curve (see FIG. 8C of the patent cited in reference) useful for producing flat-top channel shape multiplexors/demultiplexors. In the case of FIG. 4, transmissive diffraction gratings (shown with a bold dotted line) are used to provide the two dispersion steps of D/2, while an array of 1:1 microtelescopes is used to invert the wavelengths within the predetermined bands in the focal planes of the second and third lens. The bands are defined by the physical extent of those micro-lenses and their spacing.

Another example of a quantized dispersive element is presented in U.S. Pat. No. 6,337,935 by J. Ford hereby incorporated by reference in its entirety. Again the device is used to produce a flat top multiplexer. An embodiment of the present invention contemplates using a pair of such flat top demultiplexer/multiplexer based on quantized dispersive means coupled with switching means to perform wavelength switching with improved performances (mostly enabling the use of low fill factor switching array).

Figure 5:
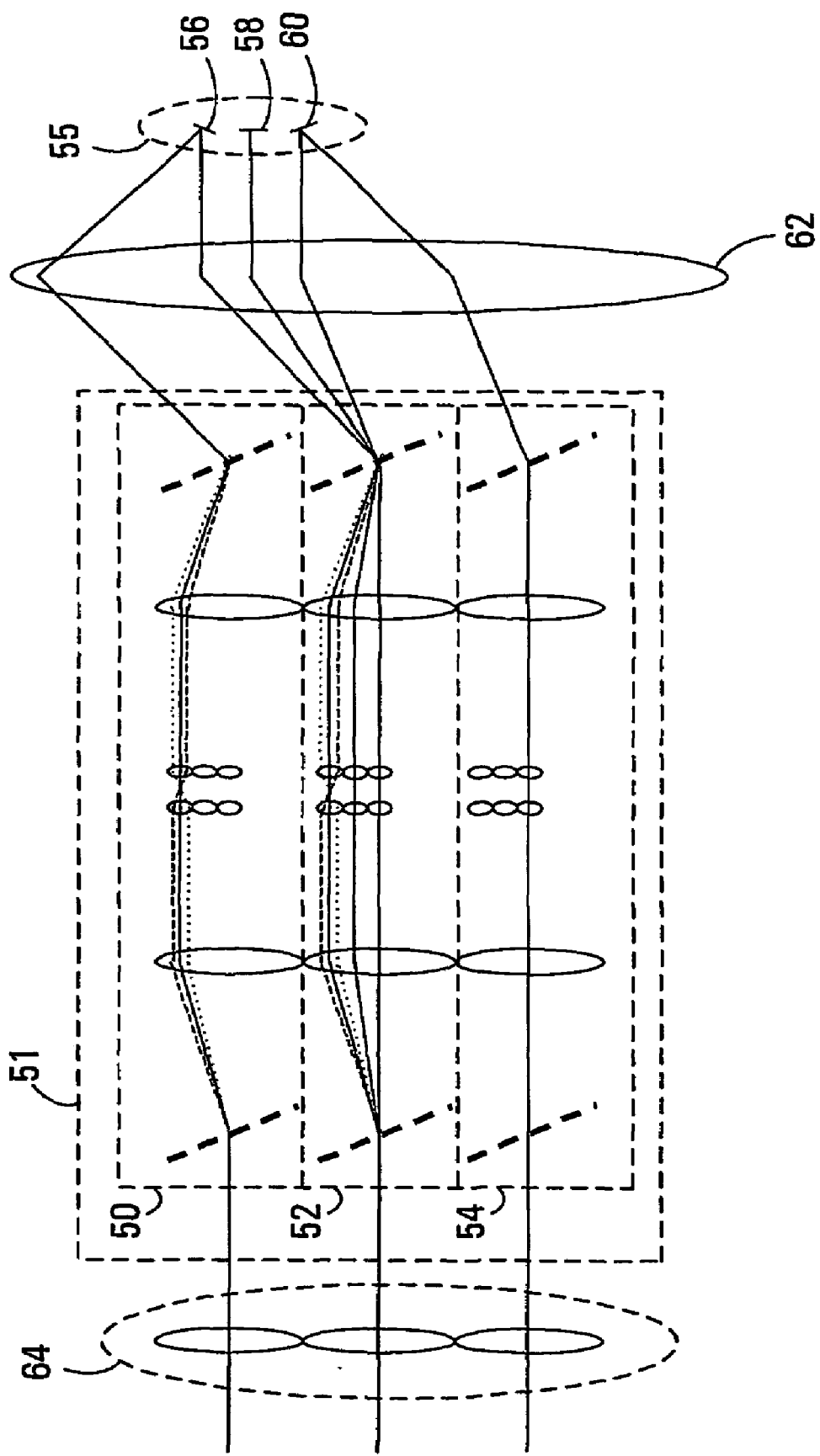
FIG. 5 shows a wavelength switch provided by an embodiment of the invention based on free-space quantized dispersion elements and low fill factor switching array.

FIG. 5 shows a free-space wavelength switch embodiment as per the invention, for example based on a quantized dispersive means as described in U.S. Pat. No. 6,381,052 hereby incorporated by reference in its entirety. It consists of an array 51 of quantized dispersive elements 50,52,54 (only three shown) and an array 55 of switching elements 56,58,60 (only three shown) arranged such that each wavelength within predetermined wavelength bands are routed by the quantized dispersive element onto a respective switching element of the switching array. The switching elements 56,58,60, are capable of routing the light from/to any of the quantized dispersive elements to/from any of the quantized dispersive elements 50,52,54. In this embodiment, all provided dispersive elements are quantized.

Other free-space embodiments of a wavelength switch as per the invention are provided using quantized dispersive means as described in U.S. Pat. No. 6,337,935.

In another embodiment there only needs to be at least one quantized dispersive element, while the others are regular continuous dispersive elements. This would enable a reduction in the cost and the complexity of the device, while still providing at least one high quality optical path (the one going from and to the at least one quantized dispersive element) and multiple alternate switching paths of lesser optical quality (i.e. narrower passband). This is typically acceptable in ROADM applications, where the express traffic needs to be of superior quality (extremely flat pass band with no spectral dips) and the local drop traffic can have a non flat-top channel shape (and in some cases, where the local drop ports are directly connected to optical receivers, this extra non flat-top filtering could even be beneficial).

In the example in FIG. 5, each quantized dispersive element performs the subsequent steps of providing a first dispersion D/2, inverting wavelengths within the predetermined wavelength bands, and providing a second dispersion D/2 as taught in U.S. Pat. No. 6,381,052. In the embodiment of FIG. 5, a big lens 62 on the right of the picture is used to provide a telecentric optical system (with the centre of the second diffraction gratings substantially lying on the focal plane of this big lens) which simplifies the routing of the light beams. Lenses 64 collimate light from optical ports (not shown) to quantized dispersive elements 50,52,54. FIG. 6 shows another quantized dispersive element taught in U.S. Pat. No. 6,144,783, from R. E. Epworth hereby incorporated by reference in its entirety where it is explained how the concatenation of two arrayed waveguide gratings 70,72 (AWG) with proper designs, and most notably with the free spectral range (FSR) of the first AWG equalling the channel spacing of the second AWG, yields such a staircase-like dispersion curve (see FIG. 5 in the cited patent). Again, this reference only covers the use of a quantized dispersion element to realize flat-top channel shape multiplexors/demultiplexors. A similar embodiment can be found in: C. R. Doerr, European Conference on Optical Communications, PD F.1.1, Amsterdam, 2001.

Figure 7:
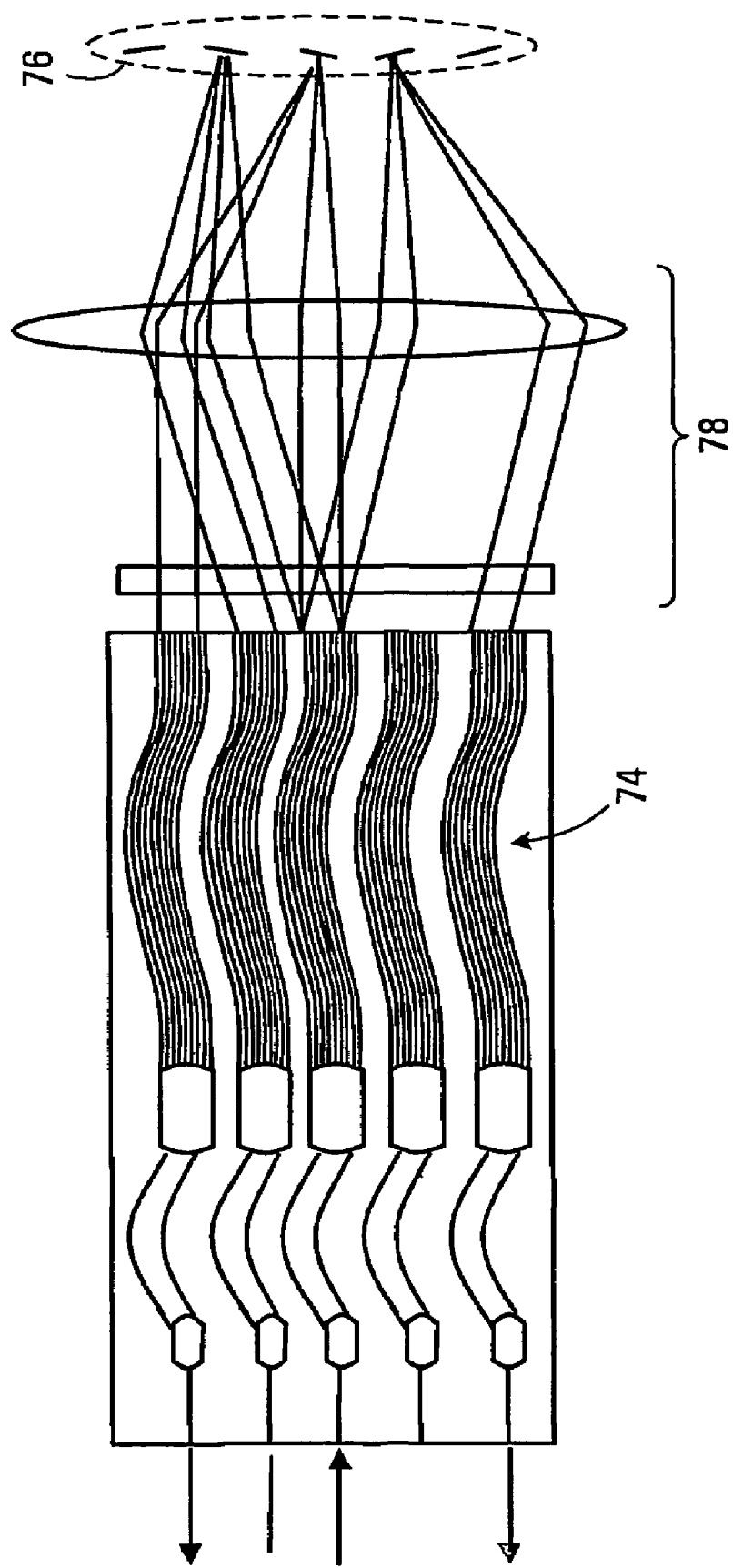
FIG. 7 shows a preferred a hybrid waveguide and MEMS arrangement combining waveguide quantized dispersion elements and a low fill factor switching array provided by an embodiment of the invention.

FIG. 7 shows an array 74 of waveguide-based quantized dispersive elements (five shown) coupled to a low fill factor array of switching elements 76 through a combination of cylindrical lenses 78 to realize an embodiment of a wavelength switch as per the invention. A similar wavelength switch assembly is described in detail in applicants co-pending patent application Ser. No. 60/381,364 filed on May 20, 2003 and which is hereby incorporated by reference in its entirety. In the embodiment shown in FIG. 7, the replacement of the continuous dispersive elements by quantized dispersive elements enables the above mentioned benefits of using lower fill factor mirror array, absence of spectral dips and absence of spurious diffraction problems from the mirrors' edges and improved wavelength alignment tolerances to the wavelength switch described in the cited patent application.

FIG. 8 shows another preferred embodiment of the invention using an array 80 of arrayed waveguide based quantized dispersive elements (three shown) and a low fill factor array of switching elements 76 and cylindrical lens combination 78 as in FIG. 7. The quantized dispersive elements each consist of at least two groups of waveguides, each group containing multiple waveguides having a predetermined relative phase relationship, and one of the at least two groups having a larger relative phase offset. Preferably, the design parameters are chosen such that the phase offset between the at least two groups of waveguides correspond to the channel spacing (in the case of 100 GHz spacing, this would mean a physical path offset of about 2065.5 microns), while the relative phase relationship between the waveguides in each of the at least two groups is chosen to provide a large FSR and the same channel spacing (in the case of 100 GHz spacing and 8 THz FSR, the relative physical path length difference between each consecutive waveguides is about 25.5 microns).

Figure 9:
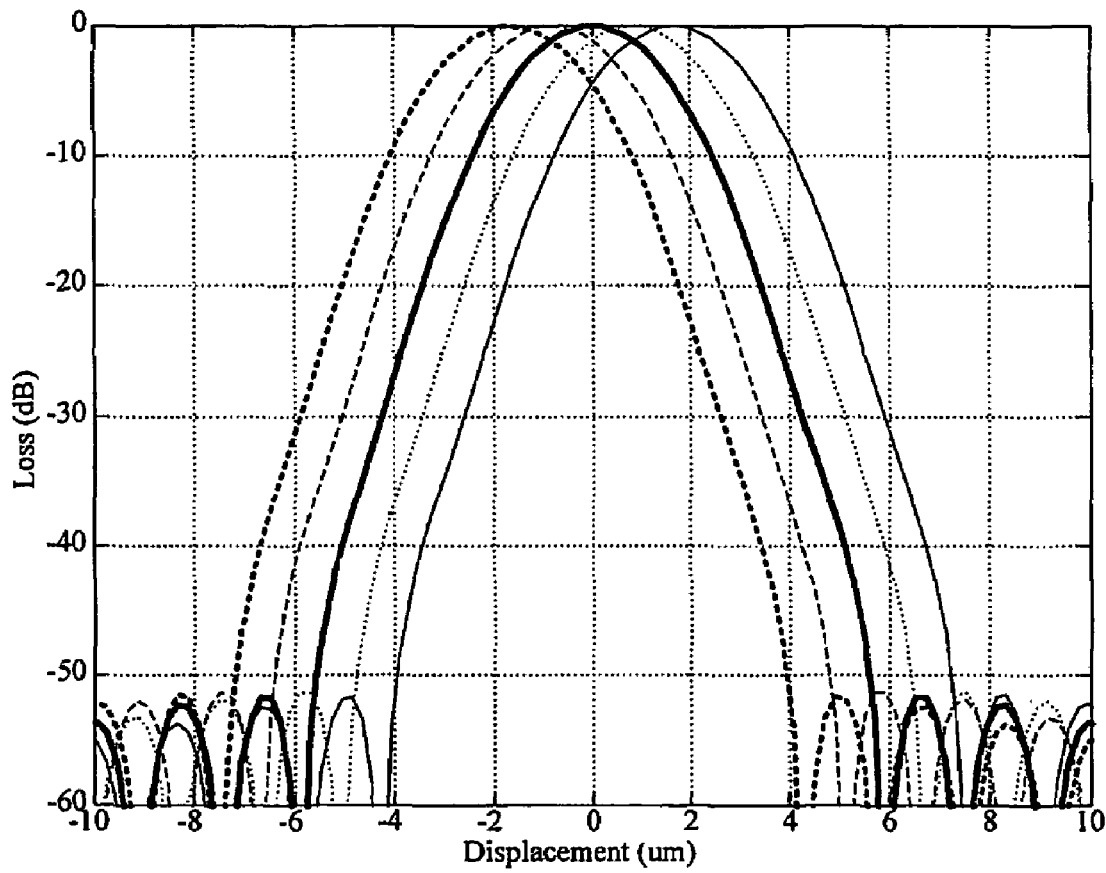
FIG. 9 shows the beam displacement in the focal plane of the main lens of FIG. 8 if a regular continuous dispersion element was used.

FIG. 9 shows the displacement of the focal spot after the big lens of FIG. 8 if a continuous dispersive element is used as disclosed in applicants invention as claimed in the above referenced co-pending patent applications. In this specific example, 250 waveguides have been used, with a relative path length difference of 25.5 microns. The big lens's focal length has been arbitrarily chosen to be 5 mm, but the actual value depends mainly on the limitation of the mirror array tilting angle and the smallest mirror array pitch achievable. As is clearly shown on FIG. 9, the peak of the focussed spots is displaced continuously with frequency over the −30 GHz to +30 GHz range with respect to ITU.

Figure 10:
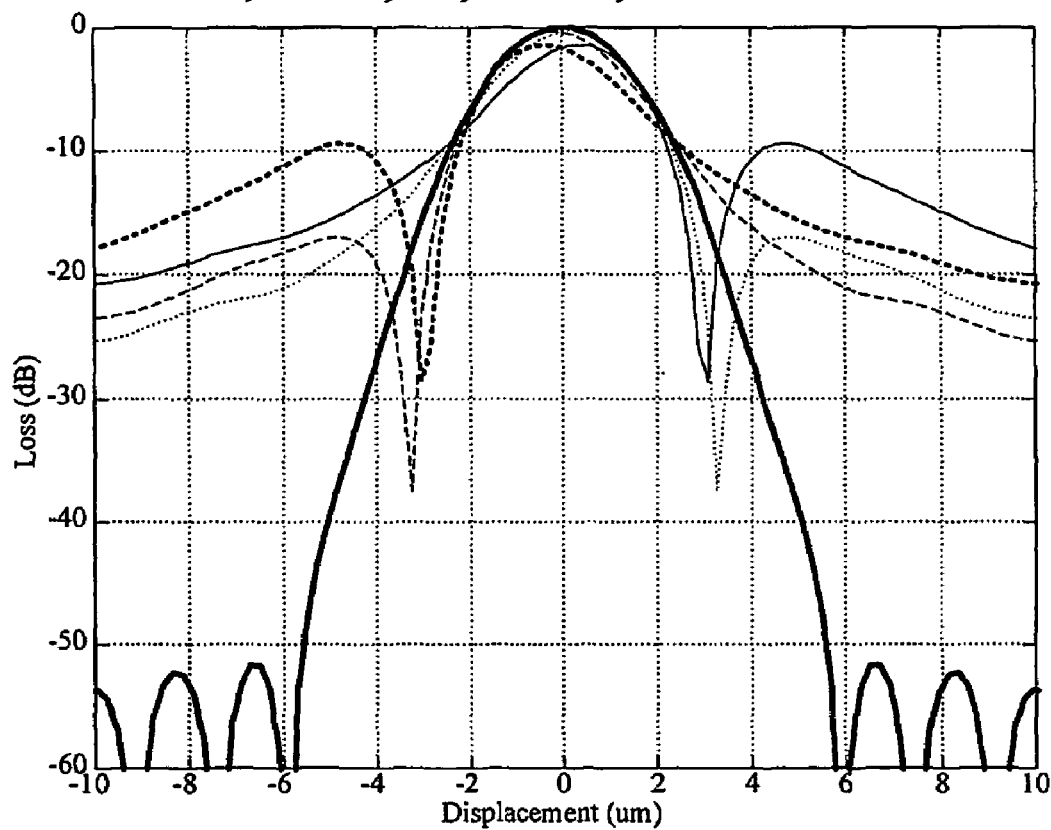
FIG. 10 shows the beam transformation in the focal plane of the main lens of FIG. 8 with the provided waveguide quantized dispersion arrangement.

FIG. 10 shows a similar plot as in FIG. 9 corresponding to the preferred embodiment described in FIG. 8, with each quantized dispersion element containing 2 groups of 125 waveguides having a physical path length offset of 2065.5 microns between each group and each of the 125 waveguides in a group having a relative optical path length difference of 25.5 microns. As can be seen on the figure, the peaks of the light beams do not substantially move over a range of −30 GHz to +30 GHz with respect to ITU. This corresponds to a quantized dispersion operation since all the beams carrying the wavelength within this −30 GHz to 30 GHz wavelength band are all routed to the same position. The side lobe level is a little high with these specific parameters, but could be reduced by design optimization.

Figure 11:
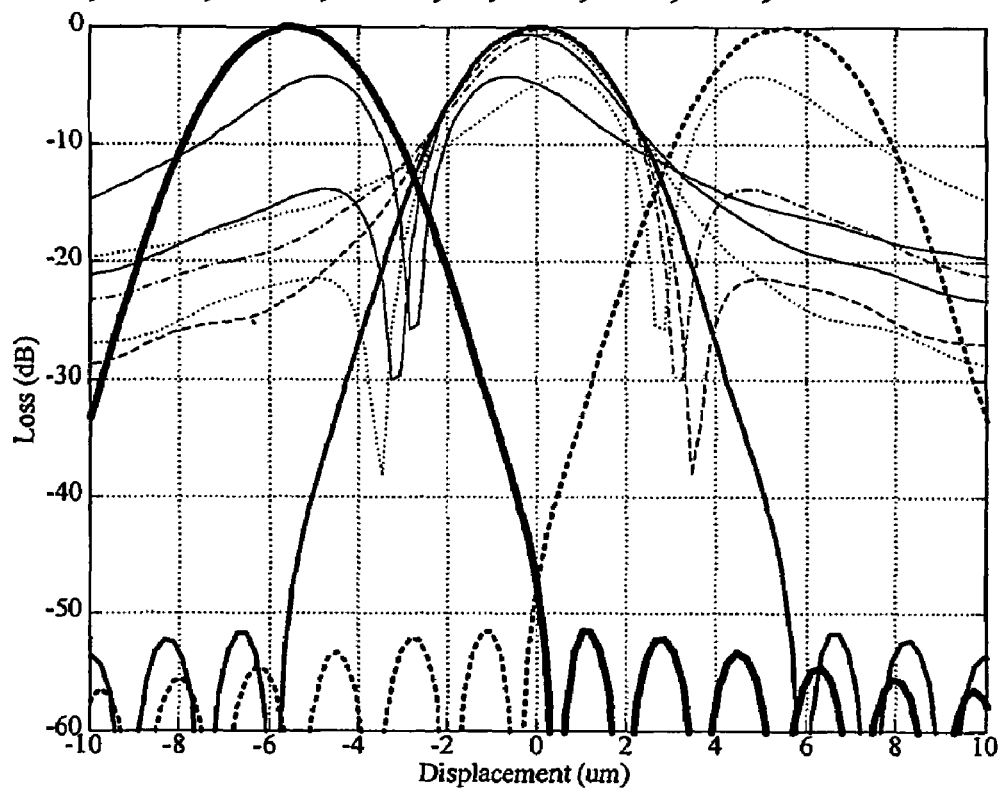
FIG. 11 shows the same result as FIG. 10 over a broader frequency range.

FIG. 11 shows the same result as shown in FIG. 10 but over a broader frequency range. The quantized operation of the quantized dispersive element is clearly shown in that only a finite set of locations are possible for the focussed light beams, corresponding to a channel spacing of 100 GHz (in the case of the figure, there are only 3 locations permitted corresponding to −100, 0 and +100 GHz).

Figure 12:
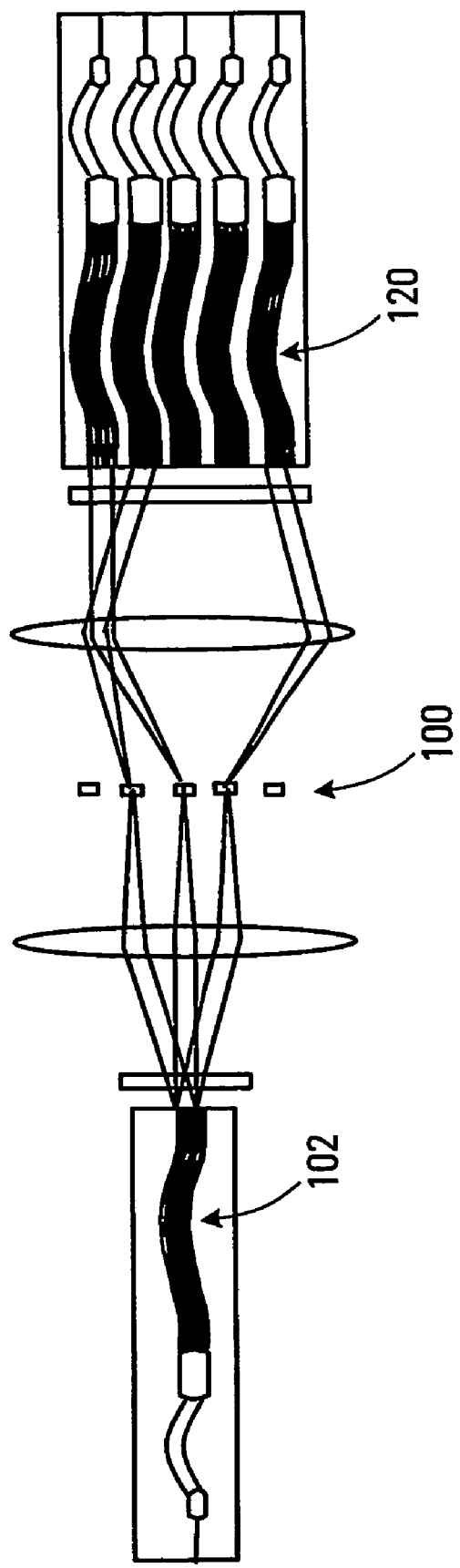
FIG. 12 shows another embodiment of the invention similar to that described in FIG. 7 in which the switching elements are transmissive switching elements.

FIG. 12 shows another embodiment as per the invention in which the switching elements are transmissive switching elements 100. Although the figure shows a similar embodiment to that of FIG. 7, the transmissive arrangement can be used with any alternate combination of dispersive means, waveguide or free-space optics based. The transmissive switching elements 100 are capable of routing the light beam going through them from an input quantized dispersion element 102 at the left of the Figure to any of the output dispersion elements 120 on the right of the Figure. At least one of the output dispersive elements 120 is a quantized dispersion element to provide at least one high quality optical port (with wide flat-top passband and no spectral dips), although the figure is shown with all 5 output dispersive elements being quantized. The array of transmissive switching elements 100 can be fabricated using electro-holograms, optical phase arrays, liquid crystal beam steering elements, movable micro-prisms or movable micro-lenses. Full details of this embodiment, but with continuous dispersive elements, are provided in applicants co-pending patent application Ser. No. 60/381,364 filed on May 20, 2003 and which is hereby incorporated by reference in its entirety. The invention described in this document basically enables to dissociate the design of the optical filtering response (mainly governed by the quantized dispersive element) from the design of the space switch itself. This is particularly important for the case of a wavelength cross-connect, since the switching requirements (larger beams are easier to switch) contradicts the wavelength filtering requirements (smaller beams are preferred to increase the spectrograph resolution, thus the channel shape). Typically, this difference is quite pronounced, usually a factor of two or more. With the described invention, it is possible to use whatever beam size is convenient for the switching core and design the necessary optics, while the wavelength filtering response is still primarily governed by how efficiently a quantized dispersion profile has been obtained.

It is also possible using the teachings of the present invention to use quantized dispersive means and an array of light processing means (capable of attenuating power, changing polarization state or detecting light signals, performing a limiting function) with the same benefit of enabling the use of a low fill factor array of light processing means.

Numerous modifications and variations of the present invention are possible in light of the above teachings. It is therefore to be understood that within the scope of the appended claims, the invention may be practised otherwise than as specifically described herein.

The invention claimed is:

1. A wavelength switch comprising:
at least one quantized dispersive element having a substantially quantized dispersion characteristic adapted to demultiplex an incoming DWDM light beam to produce a plurality of demultiplexed light beams;
a plurality of switching elements each adapted to perform light beam redirection;
the at least one quantized dispersive element being arranged to direct a respective one of the plurality of demultiplexed light beams to a respective single switching element in the plurality of switching elements for redirection;
wherein each quantized dispersive element exhibits a substantially staircase dispersion characteristic whereby the quantized dispersive element disperses each range of a plurality of ranges of wavelengths substantially at a respective angle of a finite set of angles.

2. A switch according to claim 1 further comprising:
a bulk optical element having optical power between the at least one quantized dispersive element and the plurality of switching elements adapted to couple each demultiplexed light beam onto the respective switching element.

3. A switch according to claim 2 wherein the bulk optical element having optical power is selected from a group consisting of a lens, a curved minor, an assembly of lenses and mirrors, and an assembly of lenses, mirrors and curved mirror.

4. A switch according to claim 1 comprising:
a plurality of dispersive elements including said at least one quantized dispersive element;
a respective port for each dispersive element;
wherein the switching elements are adapted to redirect each of the plurality of light beams to a respective one of the dispersive elements.

5. A switch according to claim 4 wherein all of the dispersive elements have a substantially quantized dispersion characteristic.

6. A switch according to claim 2 comprising a plurality of dispersive elements including said at least one quantized dispersive element,
wherein the switching elements are adapted to redirect each of the plurality of light beams through the bulk optical element to a respective one of the dispersive elements.

7. A switch according to claim 6 wherein all of the dispersive elements have a substantially quantized dispersion characteristic.

8. A switch according to claim 1 wherein the array of switching elements comprises an array of tiltable micro-mirrors.

9. A switch according to claim 1 wherein the array of switching elements comprises transmissive switching elements, the switch further comprising:
   a plurality of dispersive elements, wherein at least one of the plurality of dispersive elements has a substantially quantized dispersion characteristic; and
   a respective port for said at least one quantized dispersive element and for each of the plurality of dispersive elements;
   wherein the transmissive switching elements are adapted to redirect each of the plurality of light beams to a respective one of the plurality of dispersive elements.

10. A switch according to claim 9 wherein all of said plurality of dispersive elements have a substantially quantized dispersion characteristic.

11. A switch according to claim 6 wherein the array of switching elements comprises an array of tiltable micro-mirrors and wherein the dispersive elements and the array of tiltable micro-mirrors are placed substantially at focal planes of the bulk optical element having optical power.

12. A switch according to claim 1 wherein the plurality of switching elements comprises a plurality of beam steering means in transmission.

13. A switch according to claim 6 wherein the plurality of switching elements comprises a plurality of beam steering means in transmission comprising either an optical phase array or an electro-hologram and wherein the dispersive elements and the plurality of beam steering means are placed substantially at focal planes of the bulk optical element having optical power.

14. A switch according to claim 1 further comprising:
   a respective port for each dispersive element;
   a micro-optics coupling scheme adapted to couple light from each input port to and from the respective dispersive element.

15. A switch according to claim 1 further comprising:
   a respective port for each dispersive element;
   an integrated coupling optics scheme adapted to couple light from each port to and from the respective dispersive element.

16. A switch according to claim 1 wherein each quantized dispersive element is fabricated on a waveguide substrate.

17. A switch according to claim 16 wherein the bulk optical element having power comprises:
   a first transverse cylindrical lens adapted to substantially collimate light in a plane perpendicular to a plane of the waveguide substrate;
   a main cylindrical lens element adapted to focus light in a second plane in the plane of the waveguide substrate.

18. A switch according to claim 17 wherein the main cylindrical lens has a focal length such that the at least one waveguide dispersive elements are in a focal plane of the lens on a first side of the lens, and the plurality of switching elements are in a focal plane of the lens on a second side of the lens.

19. A switch according to claim 1 wherein each substantially quantized dispersive element comprises:
   two continuous dispersive elements providing respective dispersion steps of D/2;
   a plurality of micro-telescopes situated between the two continuous dispersive elements adapted to invert wavelengths within respective predetermined bands defined by a physical extent of the micro-telescopes and their spacing.

20. A switch according to claim 19 wherein the two continuous dispersive elements comprise transmissive diffraction gratings.

21. A switch according to claim 19 wherein the two continuous dispersive elements comprise reflective diffraction gratings.

22. A switch according to claim 19 wherein the two continuous dispersive elements comprise prisms.

23. A switch according to claim 16 wherein each substantially quantized dispersive element comprises:
   a concatenation of a first arrayed waveguide grating (AWG) and a second AWG with a free spectral range (FSR) of the first AWG equalling a channel spacing of the second AWG.

24. A switch according to claim 16 wherein each substantially quantized dispersive element comprises:
   at least two groups of waveguides, each group containing multiple waveguides having a predetermined relative phase relationship, and one of the at least two groups having a larger relative phase offset.

25. A switch according to claim 24 wherein a phase offset between the at least two groups of waveguides corresponds to a channel spacing while the relative phase relationship between the waveguides in each of the at least two groups is chosen to provide a large FSR and the channel spacing.

26. A switch according to claim 1 wherein the array of switching elements is a low fill factor switching array.

27. A switch comprising:
   a plurality of ports;
   for each port, a respective dispersive element wit a substantially quantized dispersion characteristic;
   a plurality of switching elements;
   a bulk optical element having optical power adapted to couple a demultiplexed light beam received from any of the dispersive elements to one of the switching elements and to couple each light beam received from one of the switching elements to a respective one of the dispersive elements;
   wherein each dispersive element further multiplexes any light beams received from the bulk optical element having power to produce a respective a multiplexed output signal at the respective port;
   wherein each quantized dispersive element exhibits a substantially staircase dispersion characteristic whereby the quantized dispersive element disperses each range of a plurality of ranges of wavelengths substantially at a respective angle of a finite set of angles.

28. A method of wavelength switching comprising:
   demultiplexing an incoming DWDM light beam using a quantized dispersive element to produce demultiplexed beams;
   coupling the demultiplexed beams onto respective switching elements in an array;
   remultiplexing the light beams into output ports;
   wherein each quantized dispersive element exhibits a substantially staircase dispersion characteristic whereby the quantized dispersive element disperses each range of a plurality of ranges of wavelengths substantially of a respective angle of a finite set of angles.

29. An apparatus comprising:
   at least one quantized dispersive element having a substantially quantized dispersion characteristic adapted to demultiplex an incoming DWDM light beam to produce a plurality of demultiplexed light beams;

a plurality of light processing elements each adapted to perform light processing;

the at least one quantized dispersive element being arranged to direct a respective one of the plurality of demultiplexed light beams to a respective single light processing element in the plurality of light processing elements for processing;

wherein each quantized dispersive element exhibits a substantially staircase dispersion characteristic whereby the quantized dispersive element disperses each range of a plurality of ranges of wavelengths substantially at a respective angle of a finite set of angles.

30. The apparatus of claim 29 wherein the light processing element is adapted to perform at least one of changing polarization state, attenuating power, detecting light signals, limiting.

31. A method comprising:

demultiplexing an incoming DWDM light beam using a quantized dispersive element to produce demultiplexed beams;

coupling the demultiplexed beams onto respective light processing elements in an array;

processing the demultiplexed beams with the light processing elements;

wherein each quantized dispersive element exhibits a substantially staircase dispersion characteristic whereby the quantized dispersive element disperses each range of a plurality of ranges of wavelengths substantially at a respective angle of a finite set of angles.

* * * * *

UNITED STATES PATENT AND TRADEMARK OFFICE
CERTIFICATE OF CORRECTION

PATENT NO. : 7,027,684 B2 Page 1 of 1
APPLICATION NO. : 10/493102
DATED : April 11, 2006
INVENTOR(S) : Thomas Ducellier et al.

It is certified that error appears in the above-identified patent and that said Letters Patent is hereby corrected as shown below:

Column 10, Claim 3, Line 48, change the word "...minor..." to read --...mirror...--

Column 12, Claim 27, Line 33, change the word "...wit..." to read --...with...--

Signed and Sealed this

Twenty-ninth Day of August, 2006

JON W. DUDAS
*Director of the United States Patent and Trademark Office*